United States Patent
Hadap et al.

(10) Patent No.: US 8,463,072 B2
(45) Date of Patent: Jun. 11, 2013

(54) DETERMINING CHARACTERISTICS OF MULTIPLE LIGHT SOURCES IN A DIGITAL IMAGE

(75) Inventors: Sunil Hadap, San Jose, CA (US); Jorge F. Lopez Moreno, Saragossa (ES)

(73) Assignee: Adobe Systems Incorporated, San Jose, CA (US)

( * ) Notice: Subject to any disclaimer, the term of this patent is extended or adjusted under 35 U.S.C. 154(b) by 1125 days.

(21) Appl. No.: 12/370,385

(22) Filed: Feb. 12, 2009

(65) Prior Publication Data

US 2013/0121567 A1  May 16, 2013

Related U.S. Application Data

(60) Provisional application No. 61/093,168, filed on Aug. 29, 2008.

(51) Int. Cl.
G06K 9/36 (2006.01)
G06K 9/44 (2006.01)
G06K 9/46 (2006.01)
G06T 15/50 (2011.01)

(52) U.S. Cl.
USPC ........... 382/286; 382/162; 382/190; 382/260; 382/274; 345/426

(58) Field of Classification Search
USPC ........... 382/286, 162, 190, 260, 274; 345/426
See application file for complete search history.

(56) References Cited

U.S. PATENT DOCUMENTS

| | | | |
|---|---|---|---|
| 5,907,629 A | 5/1999 | Funt et al. | |
| 6,304,294 B1 | 10/2001 | Tao et al. | |
| 6,636,627 B1 * | 10/2003 | Oosawa | 382/154 |
| 6,678,407 B1 * | 1/2004 | Tajima | 382/167 |
| 7,486,837 B2 * | 2/2009 | Motomura et al. | 382/274 |
| 2006/0103728 A1 * | 5/2006 | Ishigami et al. | 348/180 |
| 2006/0182367 A1 * | 8/2006 | Moghaddam | 382/276 |
| 2008/0231729 A1 * | 9/2008 | Sato et al. | 348/229.1 |
| 2010/0013965 A1 * | 1/2010 | Pugh et al. | 348/254 |

OTHER PUBLICATIONS

Lagger, et al. Multiple Light Sources Recovery in the Presence of Specularities and Texture. Technical Report IC/2005/036. Ecole Polytechnique Federale de Lausanne, 2005. Print.*
Li, et al. "Multiple-Cue Illumination Estimation in Textured Scenes." Proceedings of the Ninth IEEE International Conference on Computer Vision. 2. (1989): 1366-1373. Print.*

* cited by examiner

*Primary Examiner* — Michael A Newman
(74) *Attorney, Agent, or Firm* — Wolfe-SBMC

(57) ABSTRACT

A method, system, and computer-readable storage medium are disclosed for determining characteristics of light sources. In one embodiment, an image comprising pixels may be received. The image may be affected by a plurality of light sources including a first light source and a second light source. The first light source and the second light source may overlap. The intensity and direction of each of the plurality of light sources in the image may be determined. In one embodiment, the color of each light source may also be determined.

41 Claims, 14 Drawing Sheets

DETERMINING CHARACTERISTICS OF MULTIPLE LIGHT SOURCES IN A DIGITAL IMAGE

PRIORITY INFORMATION

This application claims benefit of priority of U.S. Provisional Application Ser. No. 61/093,168 entitled "Determining Characteristics of Multiple Light Sources in a Digital Image" filed Aug. 29, 2008, the content of which is incorporated by reference herein in its entirety.

BACKGROUND

1. Field of the Invention

The present invention is directed to computer systems; and more particularly, it is directed to the processing of digital images using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, paths, polygons, Bézier curves, and text characters) may be based upon mathematical equations to represent parts of vector graphics data in digital images. The geometric objects may typically be located in two-dimensional or three-dimensional space. A three-dimensional object may be represented in two-dimensional space for the purposes of displaying or editing the object.

Digital images such as photography, paintings, and moving pictures may include objects affected by one or more light sources. The light sources may affect the visual imagery of objects in an image even though the light sources are absent in the image itself. For example, a light bulb located beside a photographer may affect the visual imagery of the objects in an image obtained by the photographer. In computer vision and graphics, estimation of the lighting environment of an image may be desirable for many applications. For example, determining the location and relative intensity of one or more light sources may be useful in recreating the lighting environment to obtain a second image or to ensure a consistent lighting environment when re-shooting a motion picture scene.

SUMMARY

Various embodiments of systems, methods, and computer-readable storage media for determining characteristics of light sources are disclosed. In one embodiment, an image comprising pixels may be received (e.g., by a digital image editing program executing on a computer system). The image may be affected by a plurality of light sources including a first light source and a second light source. A first light emitted by the first light source and a second light emitted by the second light source may overlap. In one embodiment, the first light and the second light may overlap by greater than 90 degrees in the screen plane. In one embodiment, the first light and the second light may overlap by no greater than 90 degrees in the screen plane.

The intensity of each of the plurality of light sources in the image may be determined. The direction of each of the plurality of light sources in the image may also be determined. In one embodiment, candidate light sources may be applied to the image until an error is minimized, wherein each of the candidate light sources comprises a respective intensity and direction.

In one embodiment, the color of each light source may also be determined. Each of the plurality of light sources may be determined to be ambient or direct. The plurality of light sources may be determined to be overlapping or non-overlapping. The color of each of the plurality of light sources in the image may be determined. In one embodiment, different techniques may be used to determined the color of each light source based on whether the light sources are ambient or direct and/or based on whether the light sources are overlapping or non-overlapping.

Figure 1A:
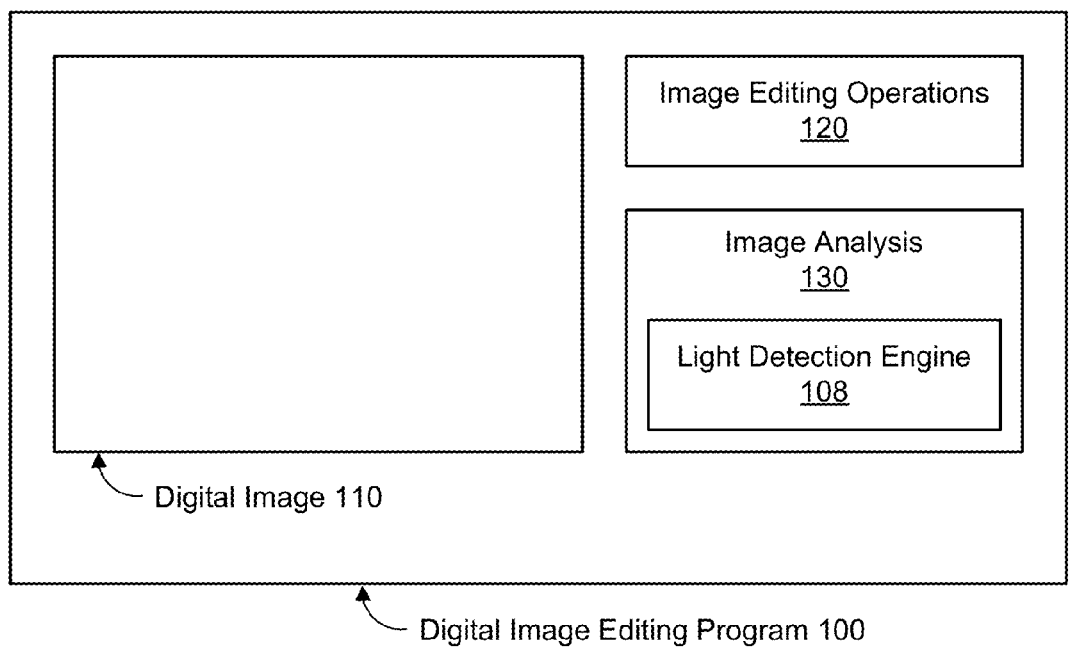
FIG. 1A is a block diagram illustrating an embodiment of a digital image editing program including image analysis functionality and configured for use with the systems, methods, and media described herein.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1A is a block diagram illustrating an embodiment of a digital image editing program 100 configured for use with the systems, methods, and media described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

The digital image editing program 100 may comprise instructions to implement image analysis functionality 130. As will be described in greater detail below, the image analysis functionality 130 may comprise one or more operations to identify characteristics of a light source of an image 110. A light source of an image 110 may comprise a light source that affects the image 110 (e.g., one or more pixels in the image 110). In one embodiment, the image analysis functionality 130 may comprise a light detection engine 108. As will described in more detail below, the light detection engine 108 may be adapted to perform operations to determine image lighting characteristics. In one embodiment, the light detection engine 108 may be implemented as a separate application that is executable separate from the image editor 100. In one embodiment, the light detection engine 108 may be implemented as an application that is executable concurrently with the image editor 100.

The editing operations 120 and image analysis functionality 130 may comprise program instructions that may be executed in association with the image editor 100. In various embodiments, the program instructions that implement the editing operations 120 and the image analysis functionality 130 may be coded as an intrinsic part of the image editor 100 or as a plug-in module or other extension to the image editor 100. The image editor 100 and its constituent elements and data may be stored in a memory 920 of a computer system 900 as illustrated in FIG. 1C.

Figure 1B:
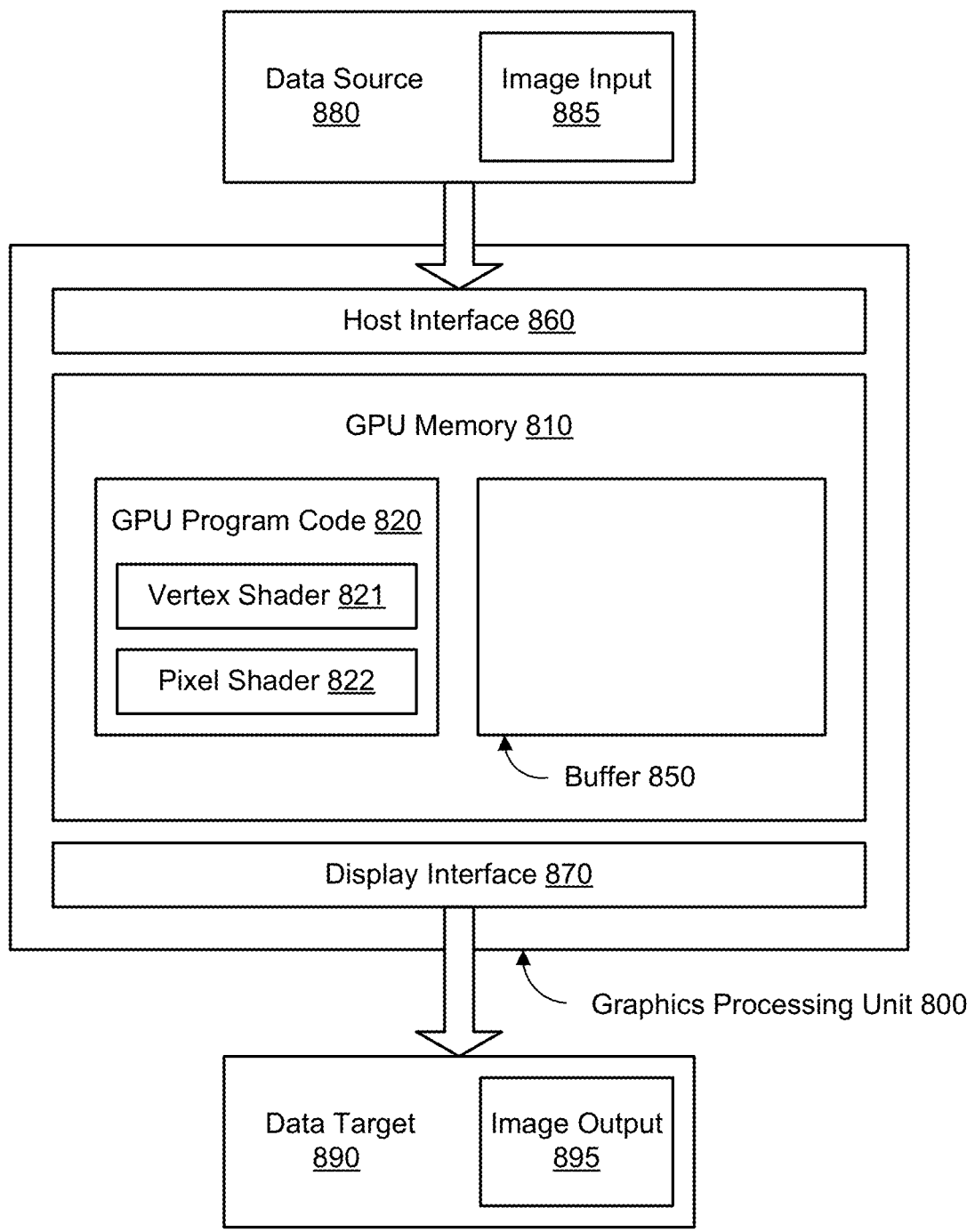
FIG. 1B is a block diagram illustrating one embodiment of a graphics processing unit (GPU) configured for use with the systems, methods, and media described herein.
Figure 1C:
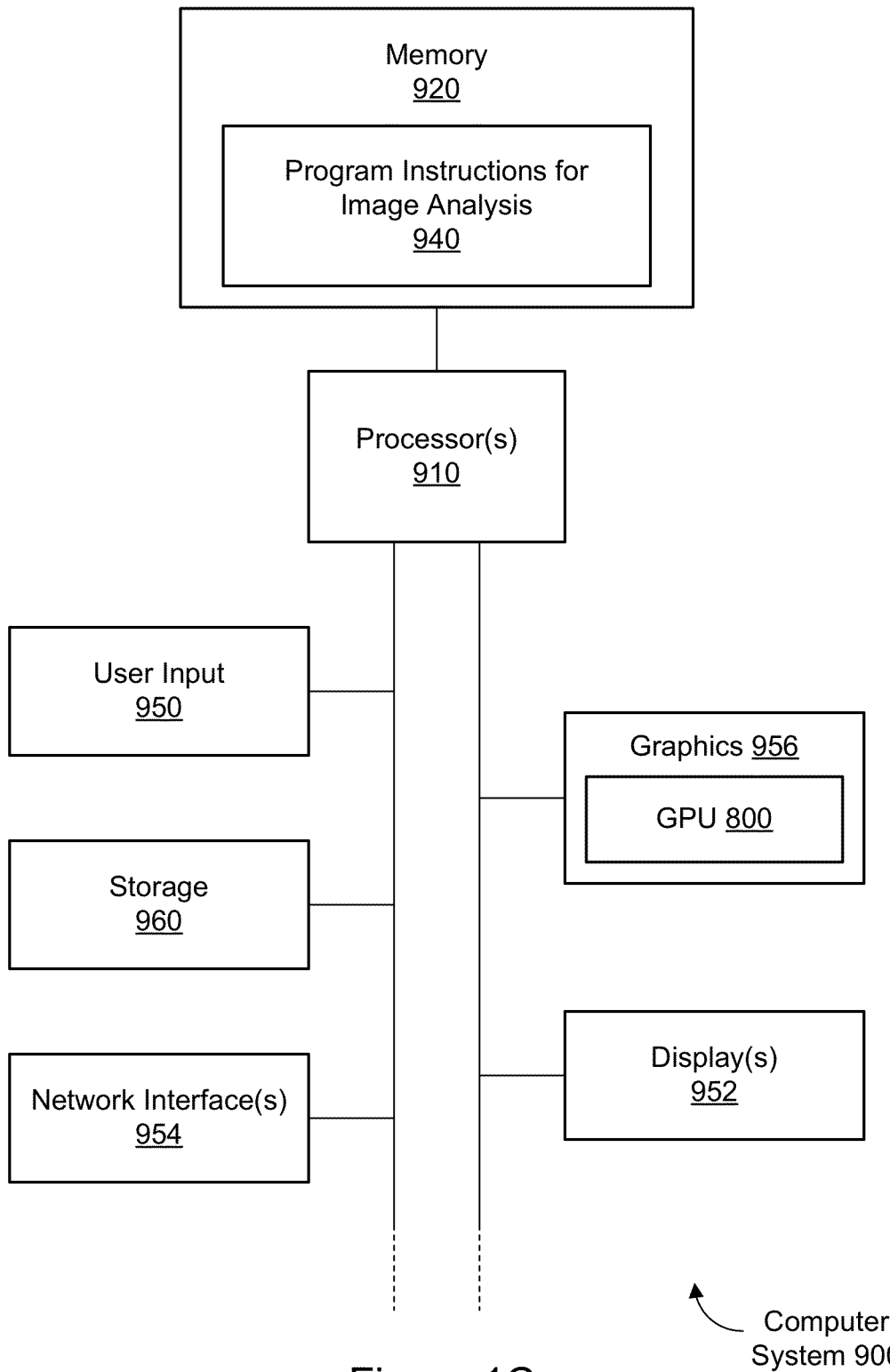
FIG. 1C is a block diagram illustrating constituent elements of a computer system that is configured to implement embodiments of the system and methods described herein.

FIG. 1B is a block diagram illustrating one embodiment of a graphics processing unit (GPU) 800 configured for use with the systems, methods, and media described herein. The GPU 800, also referred to herein as a graphics processor, may comprise a dedicated graphics rendering device associated with a computer system. An example of a suitable computer system 900 for use with a GPU is illustrated in FIG. 1C. Turning back to FIG. 1B, the GPU 800 may include numerous specialized components configured to optimize the speed of rendering graphics output. For example, the GPU 800 may include specialized components for rendering three-dimensional models, for applying textures to surfaces, etc. For the sake of illustration, however, only a limited selection of components is shown in the example GPU 800 of FIG. 1B. It is contemplated that GPU architectures other than the example architecture of FIG. 1B may be usable for implementing the techniques described herein. The GPU 800 may implement one or more application programming interfaces (APIs) that permit programmers to invoke the functionality of the GPU. Suitable GPUs may be commercially available from vendors such as NVIDIA Corporation, ATI Technologies, and others.

The GPU 800 may include a host interface 860 configured to communicate with a data source 880 (e.g., a communications bus and/or processor(s) 910 of a host computer system 900). For example, the data source 880 may provide image input data 885 and/or executable program code to the GPU 800. In some embodiments, the host interface 860 may permit the movement of data in both directions between the GPU 800 and the data source 880. The GPU 800 may also include a display interface 870 for providing output data to a data target 890. The data target 890 may comprise an imaging device 952 (as illustrated in FIG. 1C) such as a display or printer. For example, if data target 890 comprises a display device 952, the GPU 800 (along with other graphics components and/or interfaces 956) may "drive" the display 952 by providing graphics data at a particular rate from a screen buffer (e.g., the buffer 850).

In one embodiment, the GPU 800 may include internal memory 810. The GPU memory 810, also referred to herein as "video memory" or "VRAM," may comprise random-access memory (RAM) which is accessible to other GPU components. As will be described in greater detail below, the GPU memory 810 may be used in some embodiments to store various types of data and instructions such as input data, output data, intermediate data, program instructions for performing various tasks, etc. In one embodiment, the GPU 800 may also be configured to access a memory 920 of a host computer system 900 (as illustrated in FIG. 1C) via the host interface 860.

In one embodiment, the GPU 800 may include GPU program code 820 that is executable by the GPU 800 to perform aspects of techniques discussed herein. Elements of the image input 885 may be rasterized to pixels during a rendering process including execution of the GPU program code 820 on the GPU 800. Elements of the GPU program code 820 may be provided to the GPU 800 by a host computer system (e.g., the data source 880) and/or may be native to the GPU 800. The GPU program code 820 may comprise a vertex shader 821 and/or a pixel shader 822. A vertex shader 821 comprises program instructions that are executable by the GPU 800 to determine properties (e.g., position) of a particular vertex. A vertex shader 821 may expect input such as uniform variables (e.g., constant values for each invocation of the vertex shader) and vertex attributes (e.g., per-vertex data). A pixel shader 822 comprises program instructions that are executable by the GPU 800 to determine properties (e.g., color) of a particular pixel. A pixel shader 822 may also be referred to as a fragment shader. A pixel shader 822 may expect input such as uniform variables (e.g., constant values for each invocation of the pixel shader) and pixel attributes (e.g., per-pixel data). In generating the image output 895, the vertex shader 821 and/or the pixel shader 822 may be executed at various points in the graphics pipeline.

The GPU memory 800 may comprise one or more buffers 850. Each buffer 850 may comprise a two-dimensional array of pixel data (e.g., color values) and/or pixel metadata (e.g., depth values, stencil values, etc.). For example, the GPU memory 810 may comprise an image buffer 850 that stores intermediate or final pixel values generated in the rendering process. In one embodiment, the image buffer 850 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 850 may comprise a multi-sampling buffer usable for anti-aliasing.

FIG. 1C is a block diagram illustrating constituent elements of a computer system 900 that is configured to implement embodiments of the systems and methods described herein. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU) 800. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above. In one embodiment, the program instructions 940 may be executed by the host computer system 900 to send image input 885 to the GPU 800.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. The computer system 900 may also include numerous elements not shown in FIG. 1C, as illustrated by the ellipsis.

In one embodiment, characteristics associated with one or more light sources affecting an image may be determined in a non-invasive manner. Characteristics associated with the one or more light sources may include a direction or location of each light source relative to objects in the image and a relative intensity of each light source to each other. Information regarding the characteristics may be provided to a user. The lighting characteristics obtained from the image may be used in various applications. For example, the characteristics may be used to reproduce the characteristics in a lighting environment to reproduce the image, to produce another image using similar light characteristics, and/or to insert synthetic objects in the image by matching the lighting characteristics. Other applications may include shape from shading for multiple light sources, image classification, and relighting.

In one embodiment, lighting characteristics associated with one or more light sources are inferred from an image. A silhouette boundary may be selected, manually or automatically, to define an area of the image in which lighting characteristics are inferred. Areas within the silhouette boundary may be filtered to separate high frequency variations of luminance due to image diffuse reflectivity or albedo from low frequency variations of luminance due to shading. Albedo is a measure without a unit that is indicative of the diffuse reflectivity of a surface or body of an image object. The illumination intensity variations of the silhouette pixels may be analyzed to determine a pixel or pixels with the highest luminance. Each of the pixels identified with the highest luminance may be associated with a light source. A zenith coordinate (e.g., slant angle) associated with each light source may be determined. An azimuth coordinate (e.g., tilt angle) may be determined for each light source based, at least in part, on the slant angle. In a three-dimensional coordinate system, a zenith coordinate or slant angle may be defined as the angle between the z-axis and a slant angle direction vector. A slant angle direction vector may be a vector derived from a normal light source direction vector. An azimuth coordinate or tilt angle may be defined as the angle between the positive x-axis and the slant angle direction vector.

Ambient light may be determined by analyzing silhouette pixels. Ambient light may comprise the light in an image that is not necessarily associated with a particular light source. Information regarding the presence of each light source, the coordinates of each light sources, the relative intensity of each light source, and the ambient light may be provided to a user.

Figure 2:
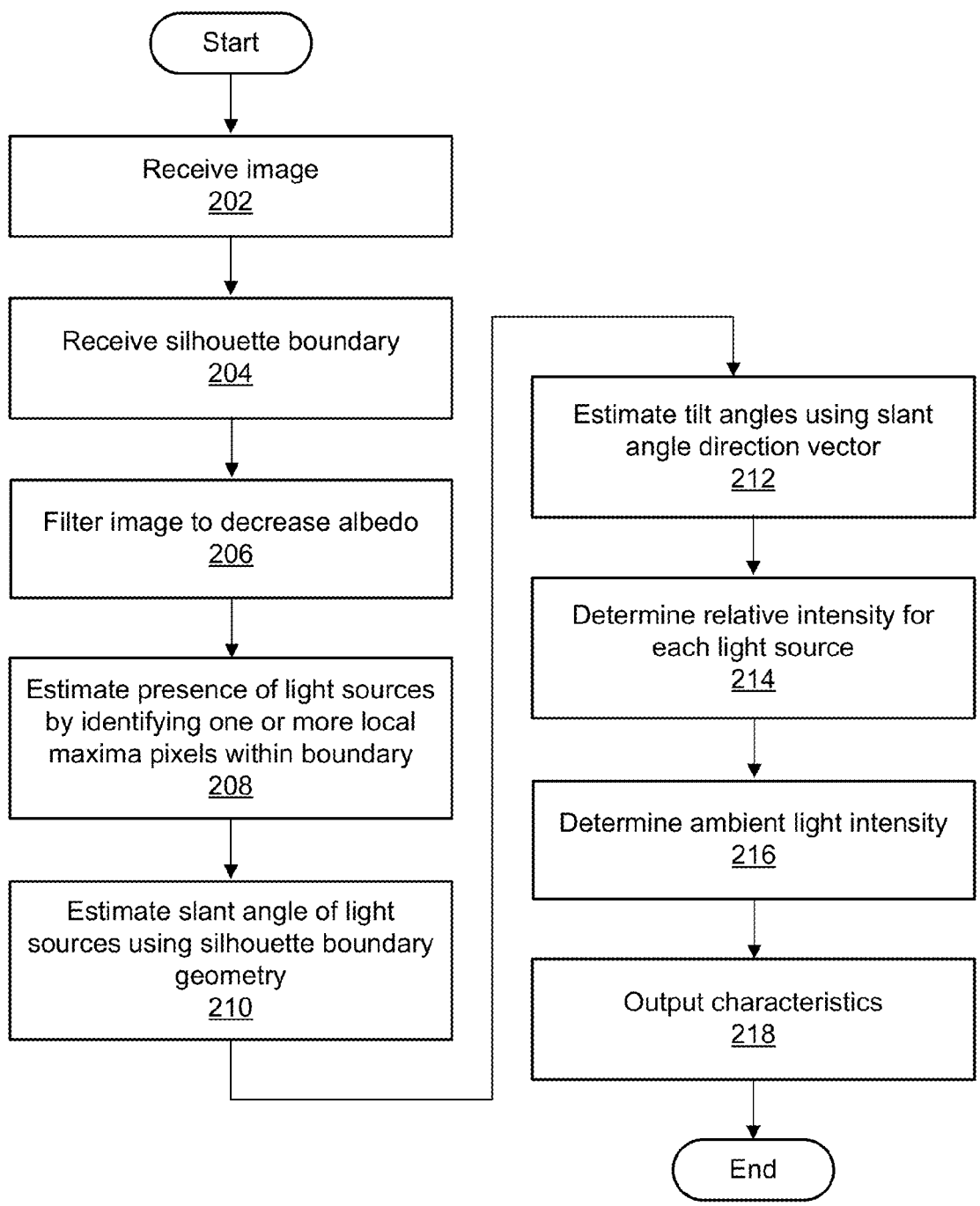
FIG. 2 is a flowchart illustrating a method for determining light source characteristics according to one embodiment.

In various embodiments, various methods may be used to detect characteristics associated with one or more light sources affecting an image. FIG. 2 illustrates one embodiment of a method for determining light source characteristics. For purposes of illustration only, the elements of this method are described with reference to the system depicted in FIG. 1, coordinate system diagram in FIG. 3, flow chart depicted in FIG. 4, and images depicted in FIGS. 5A-C.

As shown in 202, the light detection engine 108 receives an image. The image may be received from an input device. For example, a user may use a scanner to obtain an electronic representation of a photograph or painting and store the image in memory. The user may also obtain an image via a digital image capture apparatus, such as a camera, and store an electronic version of the image in memory. The user may also download an image that is stored at a remote location via a network connection from the internet or an intranet. In some embodiments, the image editor 100 may provide a function with which the user can cause an image stored in memory to be selected and sent to the light detection engine 108 for analysis.

As shown in 204, the light detection engine 108 receives a selection of a silhouette boundary. The silhouette boundary may be a boundary defining the shape or portion of an object in an image. In some embodiments, the silhouette boundary may be selected manually by the user. For example, the user can use a mouse or another type of input device to select points along the boundary of an object in the image. In other embodiments, the light detection engine 108 automatically analyzes pixels in the image and determines the presence of objects and selects the boundary of those objects. The object boundaries may be automatically identified as silhouette boundaries or provided to the user via an imaging device such that the user can manually identify the object boundaries as silhouette boundaries or modify the boundaries as desired.

As shown in 206, the light detection engine 108 filters the image to decrease the image's albedo or diffuse reflectivity. In some embodiments, the albedo or diffuse reflectivity of the image may be removed. Changes in albedo and surface indentations may falsely indicate light source effects, even when, for example, light sources have not affected those areas. Luminance intensity changes, albedo changes, and surface indentations occur at different frequency levels. Images may be filtered based on the frequency levels to remove these effects. In some embodiments, the light detection engine 108 uses a bilateral filtering method to remove the albedo. The filtering methods may be used to extract high frequency detail and low frequency detail associated with the image. The high frequency detail may include information associated with the texture and albedo of each image pixel. The low frequency detail may include information associated with the luminance changes for each image pixel, but may not include the albedo of each image pixel. The high frequency detail may be removed.

Figure 5A:
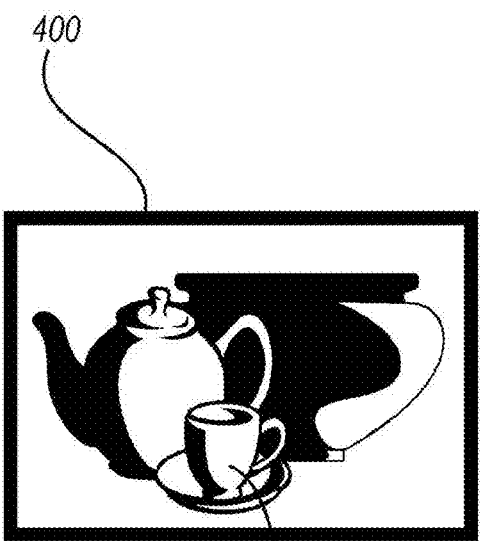
FIG. 5A illustrates an example image according to one embodiment.
Figure 5B:
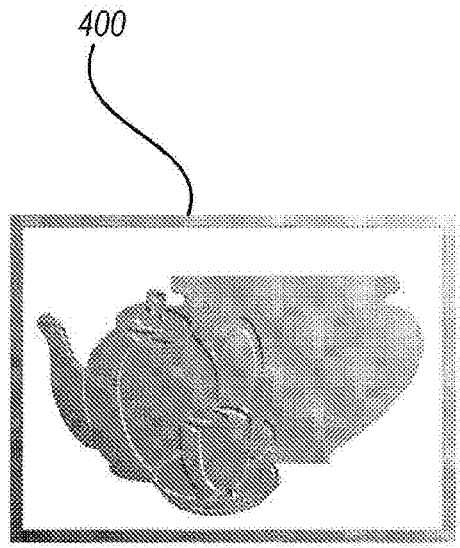
FIG. 5B illustrates the image of FIG. 5A filtered to obtain high frequency pixel information.
Figure 5C:
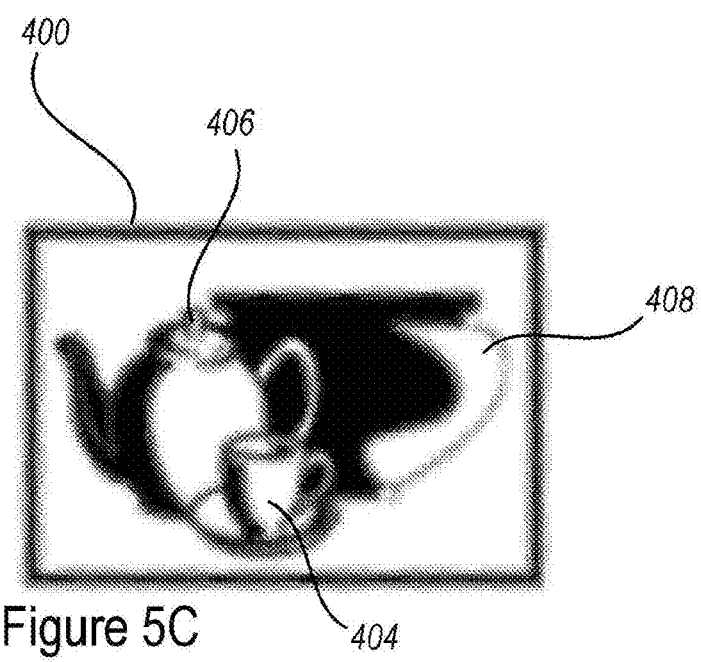
FIG. 5C illustrates the image of FIG. 5A filtered to obtain low frequency pixel information.

FIGS. 5A-C illustrate filtering an image to extract high and low frequency details according to one embodiment. FIG. 5A illustrates an example of an unfiltered image 400 containing an object 402 experiencing lighting effects from a light source not shown in the image. FIG. 5B illustrates the image 400 with low frequency detail extracted. Information regarding the texture of each pixel and albedo is retained in FIG. 5B with the varying high frequency represented using gray-scale coloring. FIG. 5C illustrates the image 400 with high frequency detail extracted. Luminance changes due to light sources are retained in FIG. 5C with the luminance changes represented using black and white coloring. For example, areas 404, 406, 408 of luminance changes, indicating an effect from a light source, are shown with whiter coloring.

In one embodiment, the image may be filtered using a bilateral filtering method by tuning the image's Gaussian kernels (e.g., space and intensity level) to meet the following equation:

$$newL(x, y) = \frac{\sum_u \sum_v b(x, u, y, v) \cdot L_x(x - u, y - v)}{\sum_u \sum_v b(x, u, y, v)}$$

$$b(x, u, y, v) = G_{spatial}\left(\sqrt{(x - u)^2 + (y - v)^2}, \sigma_{spatial}\right) \times G_L(L_x(x - u, y - v) - L_x(x, y), \sigma_L)$$

where L is the luminance intensity, $G_{spatial}$ is a spatial Gaussian filter kernel, $G_L$ is an intensity Gaussian filter kernel, $\sigma_{spatial}$ is a kernel size of the spatial Gaussian filter kernel, $\sigma_L$ is a kernel size of the intensity Gaussian filter kernel, and kernel sizes may be $\sigma_{spatial}=0.05$ and $\sigma_L=0.35$.

The bilateral filter kernel, b, may include two Gaussian filter kernels, $G_{spatial}$ and $G_L$ with kernel widths of $\sigma_{spatial}$ and $\sigma_L$, to provide user control over the recovered object shape. For example, small details may be increasingly suppressed, while overall round shape may be emphasized with increasing values of the kernel b. Once the bilateral filter is applied, the low frequency variations, as shown in FIG. 5C, may be used to analyze areas affected by light sources. In one embodiment, the bilateral filter is applied in the logarithmic domain for better behavior. A rounding function may be applied to the low frequency image version to emphasize the roundness of the overall shape.

Using filtered images indicating luminance changes, areas affected by light sources may be detected more easily. In addition, silhouette boundaries may be more accurately defined using filtered images. In one embodiment, the image may be filtered before the light detection engine 108 receives the selection of the silhouette boundary, as shown in 204. In another embodiment, the image may be analyzed without filtering to remove albedo.

As shown in 208, the light detection engine 108 estimates the presence of one or more light source by identifying at least one local maxima pixel around the silhouette boundary. The local maxima pixel may be around the silhouette boundary if it is within the area defined by the silhouette boundary, located substantially close to the silhouette boundary, or located on or along the silhouette boundary. A local maxima pixel may be a pixel having a zero luminance gradient and a positive second derivative. The light detection engine 108 may obtain the luminance value for each pixel around the silhouette boundary and identify those pixels having the highest luminance values. In some embodiments, the light detection engine 108 identifies the pixel having the highest luminance values (local maxima pixels) by observing zero crossing of luminance gradient, with a positive second derivative, such that areas affected by different light sources can be identified. For example, pixels around the silhouette boundary may include multiple pixels having locally high luminance values, but located away from each other. Such silhouette boundary areas may be identified by analyzing the luminance value of each pixel and identifying local maxima pixels. Each local maxima pixel detected indicates the presence of a light source affecting the objects within the image. In some embodiments, the number of light sources may be estimated in an iterative fashion. In other embodiments, images affected by one light source may be received and the local maxima pixel associated with the light source identified.

As shown in 210, the light detection engine 108 estimates the slant angle and intensity for each light source. In some embodiments, the relative intensities of the light sources may be estimated in an iterative fashion. The slant angle may be determined to identify a location for each light source. Each light source is located at a position relative to the image objects. A normal direction of the light from the light source may be determined using the intensity of the pixels affected by the light source and the geometry of the silhouette boundary. The surface normal on the silhouette boundary may be assumed to be in the image plane, and the light detection engine 108 may estimate the slant angle of the individual light sources using pixel luminance intensity variations within the localized area and the silhouette normal. The silhouette normal may be a slant angle direction vector. For example, the surface normal vector for each pixel in the localized area may be perpendicular to the boundary surface at the pixel. The size of the localized area may be set using a pre-set radius or group of pixels. The luminance and surface normal vector may be used to determine the light source direction at each pixel. A voting process may be used to determine the slant angle direction vector based on the light source direction determined for each pixel.

Figure 3:
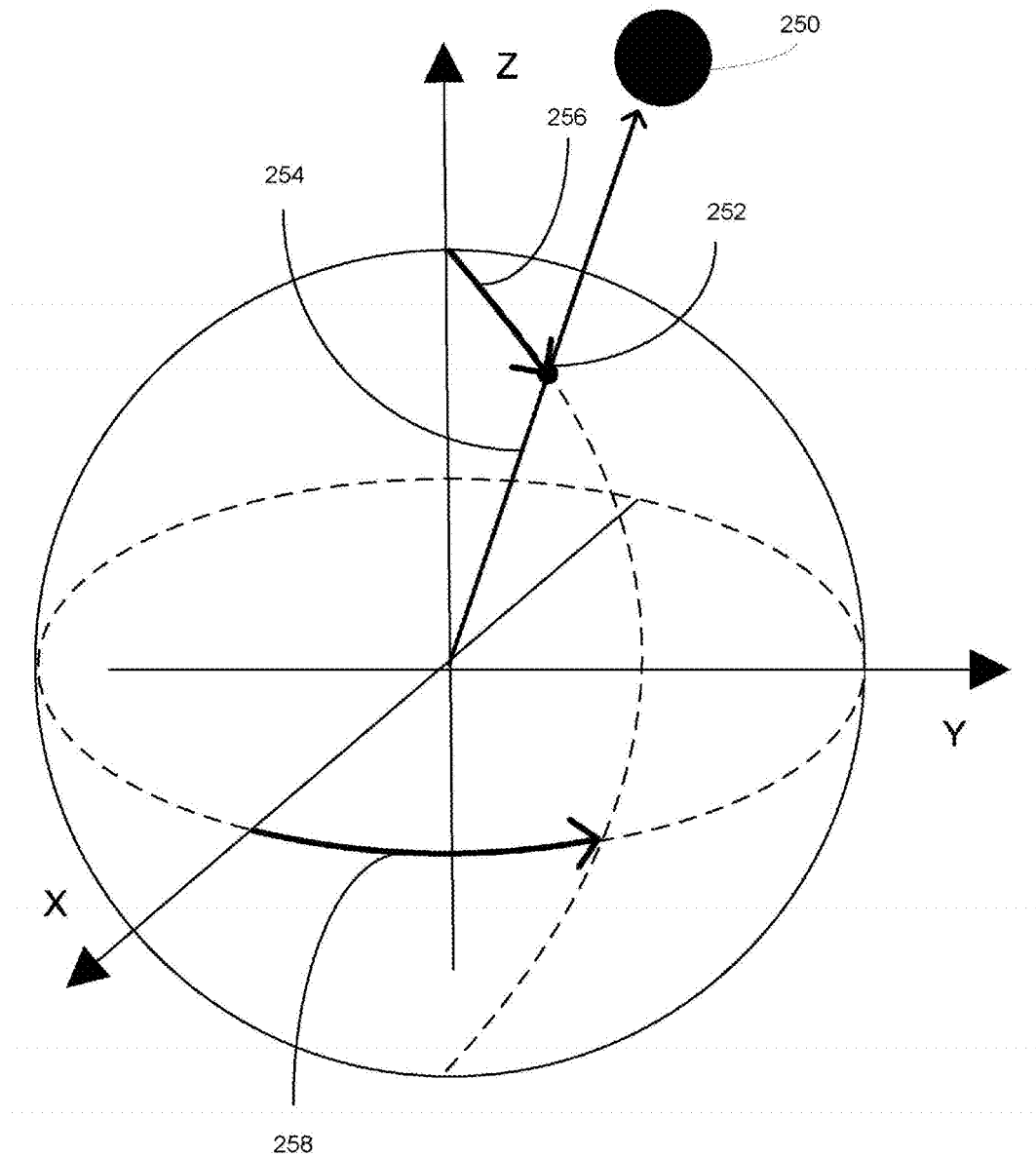
FIG. 3 illustrates a light source affecting a silhouette boundary interposed with a three-dimensional coordinate system according to one embodiment.

FIG. 3 illustrates a coordinate system with a light source 250 affecting a point 252 along a boundary of the coordinate system according to one embodiment. The point 252 may be a local maxima point detected around a silhouette boundary. After identifying the point 252, the light detection engine 108 may determine a normal light direction relative to the silhouette boundary. The normal light direction may be the direction from the silhouette boundary that the light source 250 is located. Using the normal light direction, the light detection engine 108 may determine a slant angle direction vector 254. The slant angle direction vector 254 may be a vector from zero coordinate to the light source 250 that travels through the point 252. Once the slant angle direction vector 254 is determined, the light detection engine can determine a slant angle 254 between the z-axis and the slant angle direction vector 254.

The following equation may be used to determine the slant angle direction vector and the intensity of the light source:

$$\frac{\sum_{i=1}^{i=n} \vec{N}(p_i) RGB(p_i)}{n} = \vec{L} \cdot I$$

where $\vec{N}(p_i)$ is the surface normal vector for a pixel, $RGB(p_i)$ is the luminance at the pixel's coordinates, $\vec{L}$ is the light direction at the pixel, and I is the light intensity at the pixel.

In one embodiment, the light detection engine 108 may use vectors from pixels other than the local maxima pixel. For example, the light detection engine 108 may determine the pixel having the highest luminance, $RGB(p_i)$, and set its light direction as the first light source direction. A secondary light source direction may be obtained for each pixel in the silhouette boundary of the localized area. If any of the secondary light directions are less than ninety degrees relative to the light source direction of the pixel having the highest luminance, those secondary light source directions may be added to the light direction of the pixel having the highest luminance and multiplied by the luminance of those associated pixels. The existence of a second light source may be indicated if any of the secondary light source directions are greater than ninety degrees. Those light source directions are included in the estimation of the second light source and not the first. In some embodiments, two or more pixels may have the same light source direction. A mean luminance may be determined for those pixels and only one secondary light source direction may be added to determine the light direction. If two or more pixels indicate the same light direction, a mean luminance may be determined for those pixels and only one normal light source direction vector.

Using the slant angle direction vector, the slant (zenith) angle of the light source may be determined by measuring the angle between the slant angle direction vector and a z-axis. This process may be repeated for each light source detected.

As shown in 212, the light detection engine 108 estimates the tilt (azimuth) angle of the light source using the slant angle direction vector and light source intensity. The tilt angle can be measured from a positive x-axis to the slant angle direction vector. The light detection engine 108 can analyze the variation of the intensity of pixels along the surface of the object and the slant angle direction vector to determine the tilt angle.

Returning to FIG. 3, the light detection engine 108 may analyze the variation of the intensity of pixels along the slant angle direction vector 254 to determine the tilt angle. For example, the light detection engine 108 may start at the point 252 and travel along the slant angle direction vector 254 away from the light source 250 and towards the center of the silhouette boundary. As explained in more detailed below, the intensity gradient of pixels along with a tilt angle direction vector 254 may be measured and a tilt angle 258 may be determined based on the intensity gradient. For example, if the intensity gradient is increasing, the tilt angle 258 may be the angle of the slant angle direction vector 254. If the intensity gradient is decreasing, the pixel along the slant angle direction vector 254 having the lowest intensity (not shown) may be identified, and a lowest intensity tilt angle for the pixel may be measured. In one embodiment, ninety degrees may be added to the lowest intensity tilt angle to determine the tilt angle for the light source.

Figure 4:
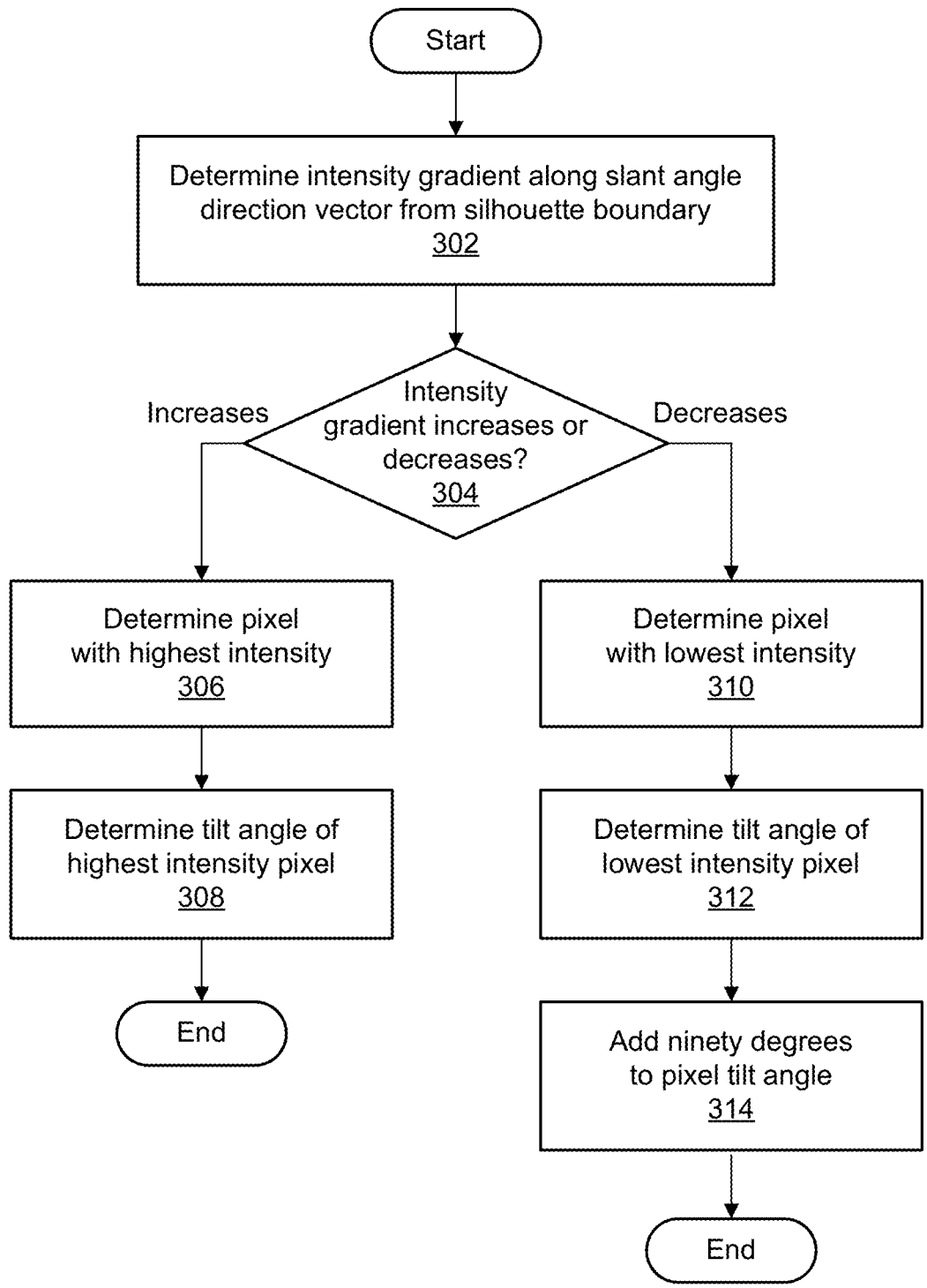
FIG. 4 is a flowchart illustrating a method for estimating a tilt angle associated with a light source according to one embodiment.

FIG. 4 illustrates one embodiment of block 212 for determining the tilt angle of the light source according to one embodiment. As shown in 302, the light detection engine 108 determines an intensity gradient along the slant angle direction vector starting at the silhouette boundary. The intensity gradient may be the change in intensity as the pixels are measured starting at the silhouette boundary. The light detection engine 108 may determine the intensity of each pixel along the slant angle direction vector from the silhouette boundary.

As shown in 304, the light detection engine 108 may determine if the gradient is increasing or decreasing. If the change in intensity, as each pixel is measured in order from the silhouette boundary along the slant angle direction vector towards the inside of the silhouette, is greater than 0, then the gradient is increasing and indicates that a light source was in front of the object. If the change in intensity, as each pixel is measured from the silhouette boundary along the slant angle direction vector towards the inside of the silhouette, is less than 0, then the gradient is decreasing and indicates that the light source was behind the object.

If the gradient is increasing, the light detection engine 108 may determine the pixel having the highest intensity, as shown in 306. As shown in 308, the tilt angle of the pixel having the highest intensity may be determined by measuring the tilt angle of a vector from the light source through the pixel having the highest intensity. The tilt angle of the pixel having the highest intensity is the same as the tilt angle of the light source.

As shown in 310, if the gradient is decreasing, the light detection engine 108 may determine the pixel having the lowest intensity. As shown in 312, the tilt angle of the pixel having the lowest intensity may be determined. As shown in 314, the tilt angle of the light source may be determined by adding ninety degrees to the lowest intensity pixel tilt angle.

The method may be repeated for each detected light source. Returning now to FIG. 2, once the tilt angle of each light source is determined, the light detection engine 108 may determine the relative intensity of each light source, as shown in 214. The relative intensity of each light source may be determined by comparing the intensities of each light source to each other and assigning a relative intensity value based on those intensities to each light source. The relative intensity value may be a number on scale with which the relative intensity of each light source can be compared. In some embodiments, the relative intensity value of the local maxima pixel associated with each light source may be used to compare the intensities of each light source. In other embodiments, a mean average of all pixels within the pre-set radius or group of pixels associated with each light source may be determined and used to compare the intensities of each light source.

As shown in 216, the light detection engine 108 may determine the ambient light intensity of the image. The light detection engine 108 may identify the pixel having the lowest intensity. The pixel may be within the silhouette boundary or, in some images, outside the silhouette boundary. The intensity of the pixel having the lowest intensity may be identified as the ambient light intensity of the image.

As shown in 218, the light detection engine 108 may output characteristics associated with the image. The characteristics may include the intensity of the ambient light, the identification of each light source detected, the slant angle and tilt angle of each light source, and/or the relative intensity of each light source. The light detection engine 108 may output the characteristics by providing them to an imaging device or other target. For example, the characteristics may be displayed on the graphical user interface (GUI) or sent via a network connection to a location on the network. In one embodiment, the characteristics are associated with the image and stored in memory.

Figure 6A:
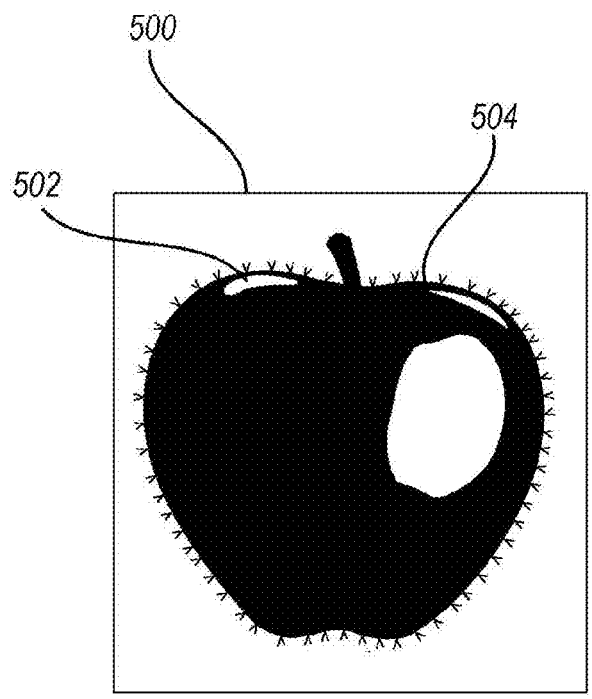
FIGS. 6A-E illustrate an example of determining characteristics associated with a plurality of light sources affecting an image according to one embodiment.
Figure 6B:
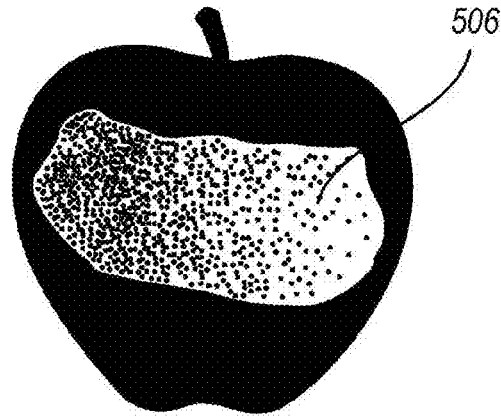
Figure 6C:
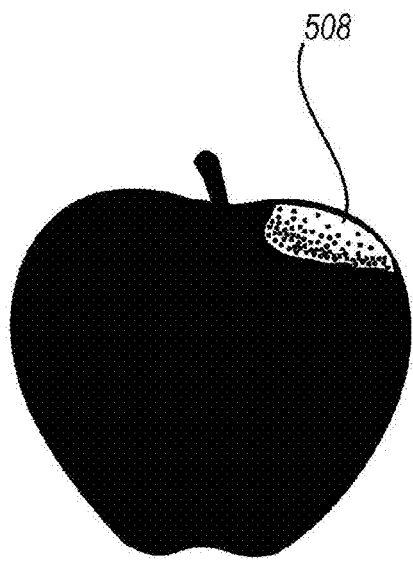
Figure 6D:
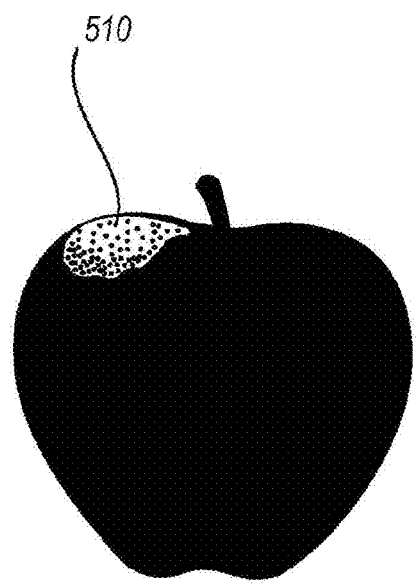

An example of determining characteristics associated with a light source using an image according to one embodiment of inventive concepts disclosed herein is described below with reference to FIGS. 6A-E. FIG. 6A shows an image 500 that includes an apple 502 as an object. The image 500 is received, along with a silhouette boundary 504. The silhouette boundary 504 generally defines the boundary of the pixels associated with the apple 502. The silhouette boundary 504 includes pixels affected by three light sources. FIGS. 6B-D show filtered images with albedo decreased or removed, in which pixels affected by each light source are shown in white color. FIG. 6B illustrates pixels 506 located on the front of the apple 502 affected by a first light source. FIG. 6C illustrates pixels 508 located approximately forty-five degrees relative to the x-axis of the image affected by a second light source. FIG. 6D illustrates pixels 510 located at the top of the apple 502 and slightly to the left of center. Each of these sets of pixels 506, 508, 510 define three different groups of pixels, each of which includes a local maxima pixel having the highest luminance intensity within that group.

The local maxima pixel for each group of pixels may be identified, and the presence of each light source may be determined. The relative intensity of each light source may be determined using the intensity of each local maxima pixel. The slant angle direction vector may be detected using the silhouette boundary geometry. For example, a first light source direction vector for the local maxima pixel in set of pixels 506 may be determined. Secondary light source direction vectors for other pixels within set of pixels 506 may be determined and added to the light source direction vector for the local maxima pixel to obtain the slant angle direction vector. The slant angle of each light source may be determined using the slant angle direction vector.

Figure 6E:
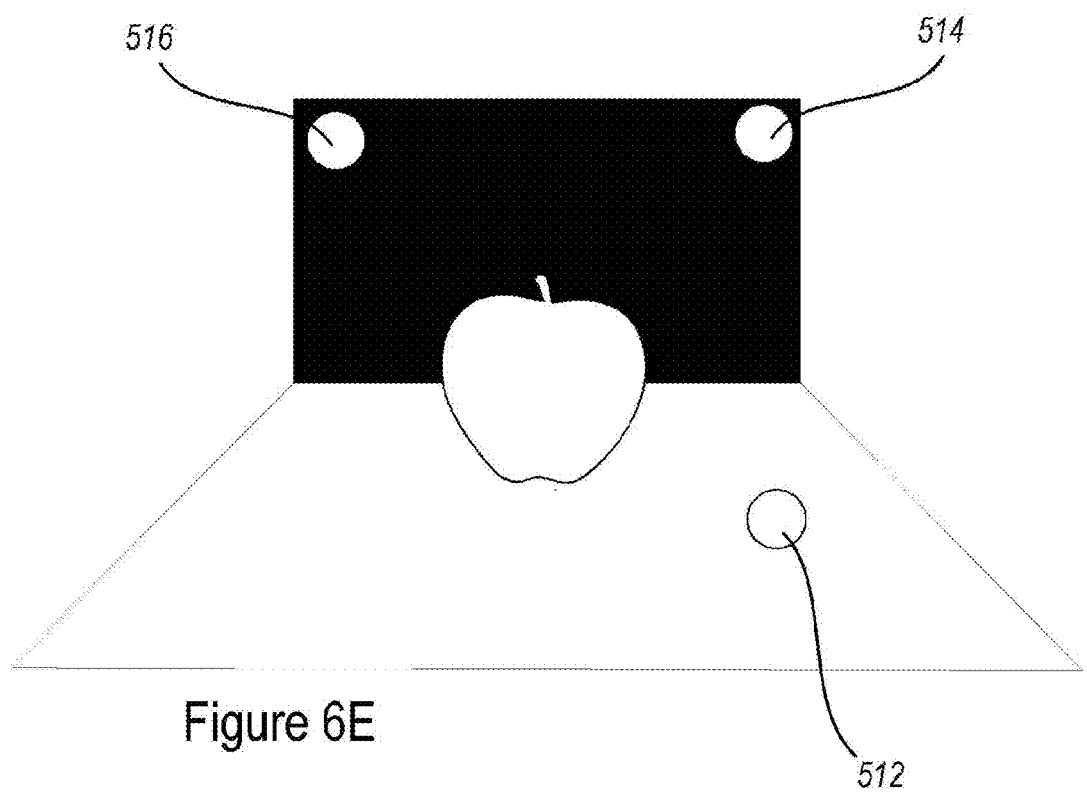

The tilt angle for each light source may be determined using the slant angles by determining the intensity gradient of pixels starting from the silhouette boundary and following a line defined by the slant angle direction vector. For set of pixels 506, the light source is in front of the apple 502 and the intensity gradient increases. Thus, the tilt angle of the pixel having the maximum intensity may be the tilt angle of the light source. For both set of pixels 508 and 510, the intensity gradient decreases, indicating a light source that is behind the apple 502. The pixel within each set of pixels 508, 510 having the lowest intensity may be determined, along with the tilt angle for each of those pixels. The tilt angle for each light source associated with set of pixels 508, 510 may be determined by adding ninety degrees to the each pixel's tilt angle. FIG. 6E is a graphical representation of the apple 502 and the relative location of each light source 512, 514, 516.

The ambient light intensity may be determined from the image 500 in FIG. 6A. The pixel within the silhouette boundary 504 having the lowest intensity may be identified. This pixel may be located in the shadowed area on the far left side of apple 502. The intensity of that pixel may be the ambient light intensity for the image 500.

After all the characteristics are determined, they may be provided to a user via a graphical user interface (GUI). The user may then use the characteristics to recreate the lighting environment in order to obtain a second image of the apple 502 using the same lighting characteristics or to create synthetic objects and include them in image 500 using the lighting characteristics.

In one embodiment, the systems and methods for determining light source characteristics as discussed above may be augmented as follows. In one embodiment, characteristics of overlapping light sources may be determined. For example, the characteristics of lights overlapping by more than 90 degrees in the screen plane may be determined in addition to the characteristics of lights overlapping by 90 degrees or less. References herein to overlapping light sources may include overlapping lights emitted by those light sources. In one embodiment, color characteristics of each light source may be determined. The color may be determined in addition to other characteristics including direction and intensity.

Figure 7:
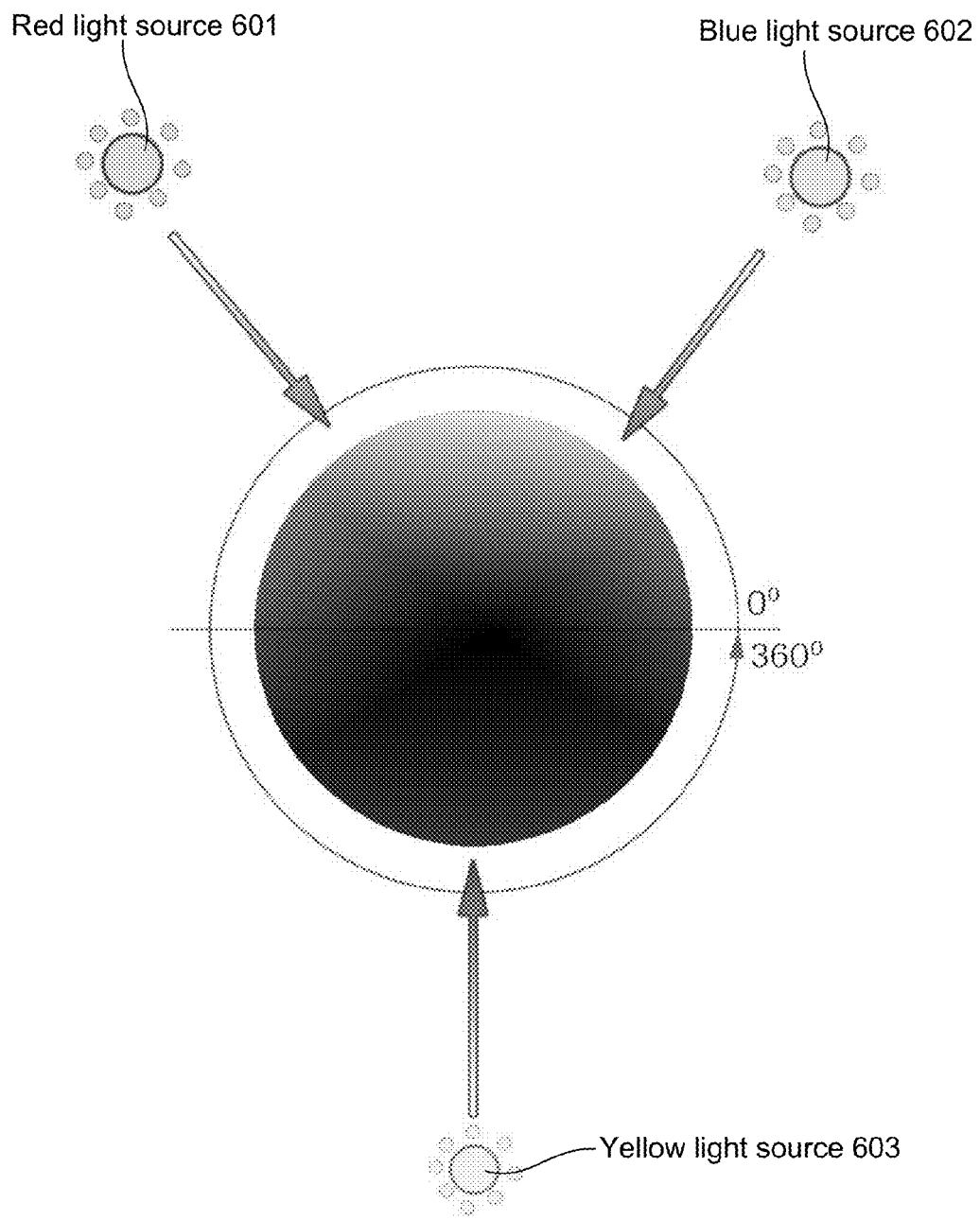
FIG. 7 illustrates an example of three light sources whose characteristics may be determined according to one embodiment.

FIG. 7 illustrates an example of three light sources whose characteristics may be determined according to one embodiment. Three light sources 601, 602, 603 affecting an image may have varying color characteristics. For example, the light source 601 may have a red color, the light source 602 may have a blue color, and the light source 603 may have a yellow color. The color characteristics of the three light sources 601, 602, 603 may be determined using the systems and methods described herein. In one embodiment, the direction and intensity of the three light sources 601, 602, 603 may also be determined using the systems and methods described herein.

In various embodiments, aspects of the systems and methods discussed above with respect to FIGS. 2-4 may be performed again for estimating characteristics of light sources overlapping by more than 90 degrees and/or for estimating color characteristics of light sources. In one embodiment, intensity levels may be estimated more accurately by using the following techniques instead of the zenith coordinate (e.g., slant angle) estimation techniques discussed above with respect to FIGS. 2-4. A contour including a plurality of connected points may be estimated by computing the normals of the points. The gradient at the points may be analyzed to eliminate high-frequency albedo variations. As discussed above, albedo is a measure without a unit that is indicative of the diffuse reflectivity of a surface or body of an image object. The high-frequency albedo variations may correspond to a change of material or texture. The albedo variation may be stored to tag the corresponding pixels as a patch having similar albedo.

Figure 8:
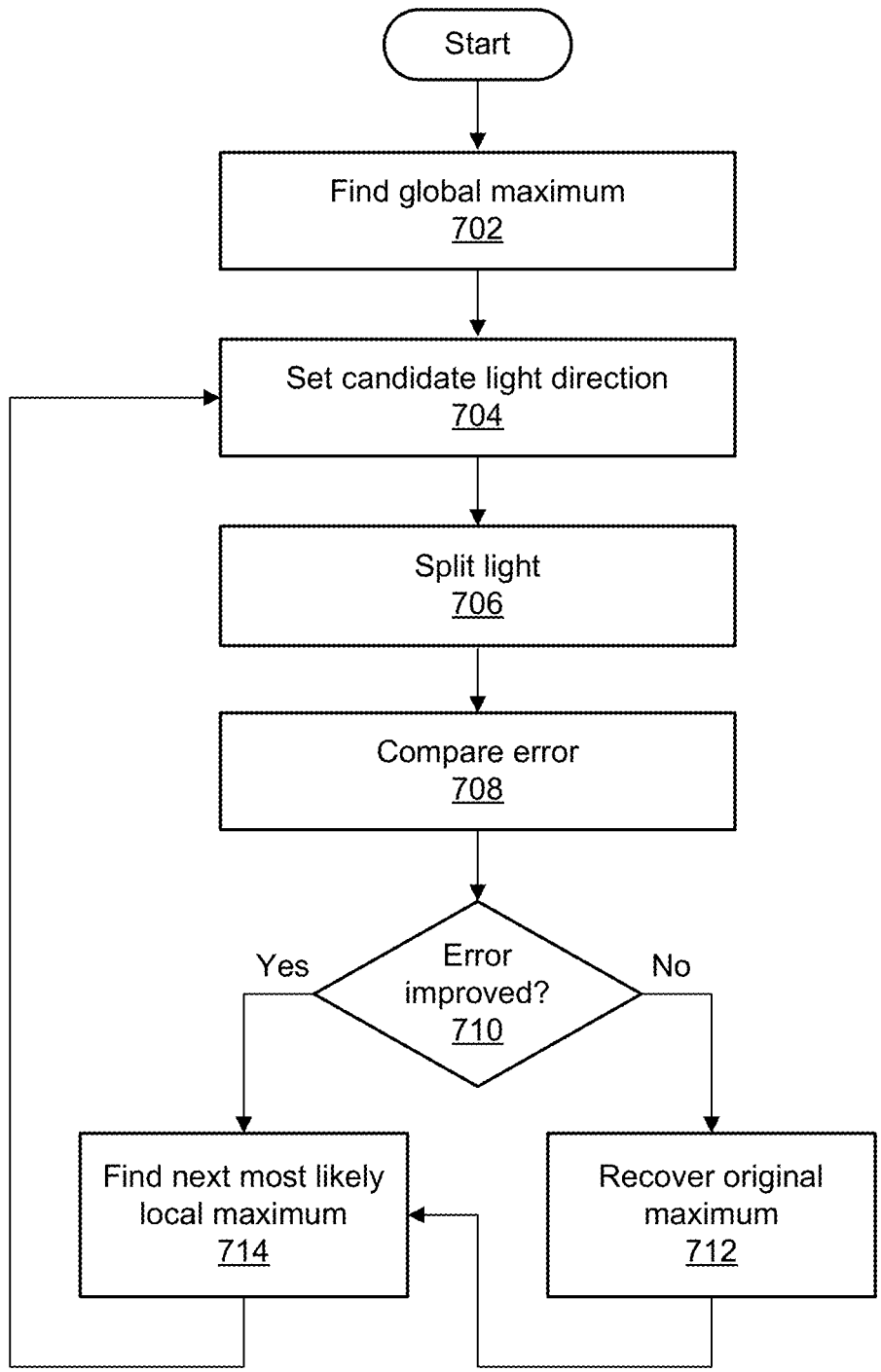
FIG. 8 is a flowchart illustrating a method for determining characteristics of light sources according to one embodiment.

Based on the determined "ground truth" albedo values, rendering may be attempted for a similar image by using a constant color contour as a starting object. Lights with different intensities and colors may be added such that the overall error is minimized pixel-by-pixel. FIG. 8 is a flowchart illustrating a method for determining characteristics of light sources according to one embodiment. As shown in 702, the brightest point or cluster of points of the contour (i.e., the global maximum) may be selected. As shown in 704, the normal of the points or cluster may be set as a candidate light direction. The process may then attempt to determine whether the point is a single light or two overlapping lights yielding a global maximum. A singular point may be found, and the light corresponding to the point may be split into two overlapping light sources as shown in 706. To avoid noise issues and accelerate the process, the error from the light and the ground truth image may be used instead of using tangents or local gradients to detect them. It may be expected that the points are near the maximum (positive) error. The overall error may be checked, pixel by pixel, as shown in 708. If the error has improved, as determined in 710, then it may be determined that two lights are involved. However, if the error has not improved, as determined in 710, then the original maximum may be recovered, as shown in 712.

As shown in 714, the next most likely local maximum in luminance values may be found, and the procedure may continue by checking the error as shown in 704. In one embodiment, the operations shown in 704 through 714 may be repeated (e.g., iteratively) for the current local maximum until the overall error does not improve. In one embodiment, the operations shown in 704 through 714 may be repeated (e.g., iteratively) for the current local maximum until the overall error is at an acceptable level (e.g., in comparison to a predefined threshold). To select the next pixel, a function may be applied to all the pixels that will yield the unlikeliness of a pixel in the contour to be explained by the previous configuration of lights.

Figure 9A:
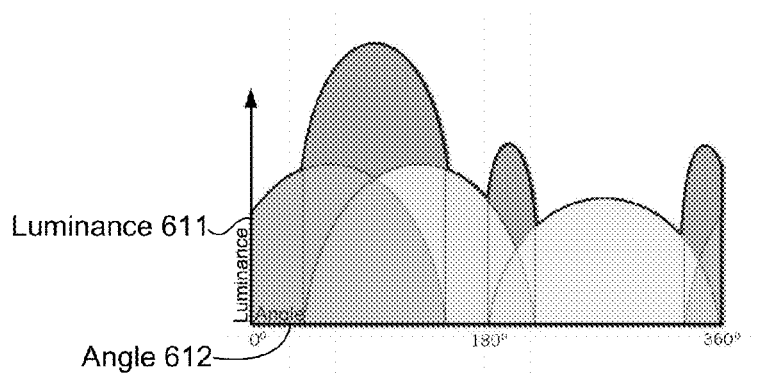
FIGS. 9A-9D further illustrate techniques for determining characteristics of light sources in an image according to one embodiment.
Figure 9B:
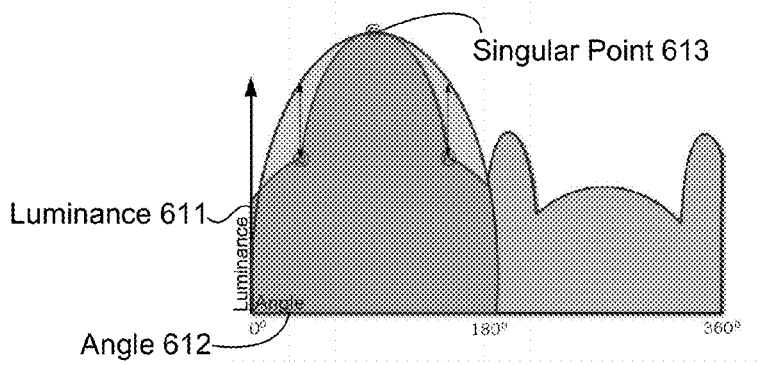
Figure 9C:
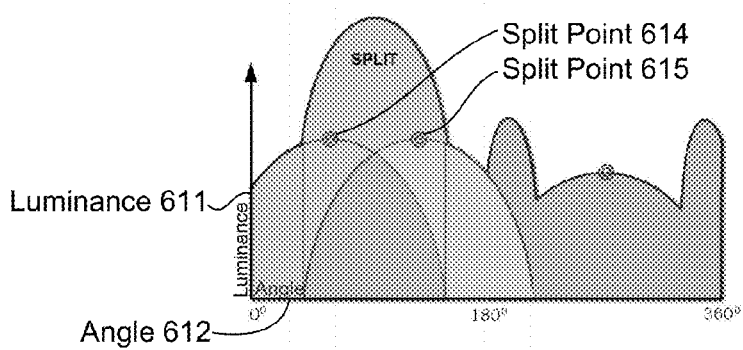
Figure 9D:
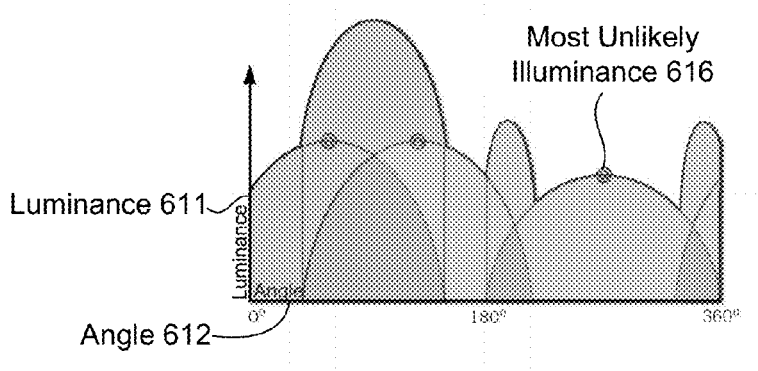

FIGS. 9A, 9B, 9C, and 9D further illustrate techniques for determining characteristics of light sources in an image according to one embodiment. FIG. 9A shows an example configuration of light sources in an image graphed by luminance 611 on one axis and angle 612 on the other axis. FIG. 9B illustrates the singular point 613 found in 702 of FIG. 8. FIG. 9C illustrates the splitting of the singular point 613 into two split points 614 and 615 as performed in 706 of FIG. 8. FIG. 9D illustrates the most unlikely illuminance 616 at the current setting.

In one embodiment, the color and intensity of a light source may be determined as follows. In one embodiment, an approach based on the subjective nature of human color perception may be used to infer the colors of the lights. One feature of human color perception is the color constancy effect. Color constancy may ensure that the perceived color of objects remains relatively constant under varying illumination conditions. Due to the color constancy effect, humans may perceive the relationship between lights in an image but may not be able to determine the real color of any given light. By employing these principles to infer the color characteristics of lights in an image, the white-balance problem may be substantially avoided in one embodiment.

In one embodiment, it may be determined which of three possible scenarios represents the image: (1) ambient light and direct light, (2) two or more overlapping direct lights, and (3) non-overlapping direct lights. As discussed below, a different approach may then be applied for each of the three scenarios. In all of the scenarios, the relative colors and intensities between the light sources may be determined.

If the first scenario is determined to represent the image, then the following approach may be taken in one embodiment. Given two points in the same albedo patch under the influence of only one light source, any inconsistency in the radiance equation may be assigned to the presence of an ambient light source that is assumed to be white according to the color constancy effect. In this manner, both the intensity (relative to albedo) of the light source and its color (e.g., represented as RGB) may be determined.

If two or more lights are present and overlapping (i.e., the second scenario represents the image), an albedo patch under the influence of both may be determined. In the same manner, the relationship between both sources may be inferred. If two or more lights are not overlapping (i.e., the third scenario represents the image), then for each light, the process may look for two patches with different albedo under its influence and solve the radiance equation to disambiguate the color and intensity of the light. If the albedo is constant, then the color of the light may be chosen as white to avoid the disambiguation process. In one embodiment, the user may choose between two color values.

Figure 10:
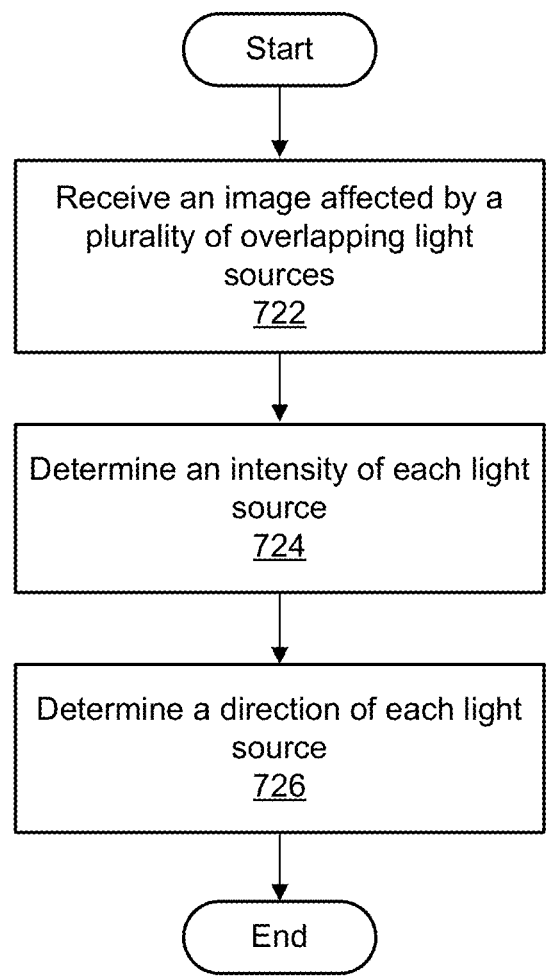
FIG. 10 is a flowchart illustrating a method for determining characteristics of overlapping light sources according to one embodiment.

FIG. 10 is a flowchart illustrating a method for determining characteristics of overlapping light sources according to one embodiment. As shown in 722, an image comprising pixels may be received (e.g., by the digital image editing program 100 executing on a computer system 900). The image may be affected by a plurality of light sources including a first light source and a second light source. The first light source and the second light source may overlap. In one embodiment, the first light source and the second light source may overlap by greater than 90 degrees in the screen plane. In one embodiment, the first light source and the second light source may overlap by no greater than 90 degrees in the screen plane.

As shown in 724, the intensity of each of the plurality of light sources in the image may be determined. As shown in 726, the direction of each of the plurality of light sources in the image may be determined. The intensities and directions of the light sources may be determined according to the systems and methods discussed above. For example, candidate light sources may be applied to the image until an error is minimized, wherein each of the candidate light sources comprises a respective intensity and direction. In one embodiment, the color of each light source may also be determined.

Figure 11:
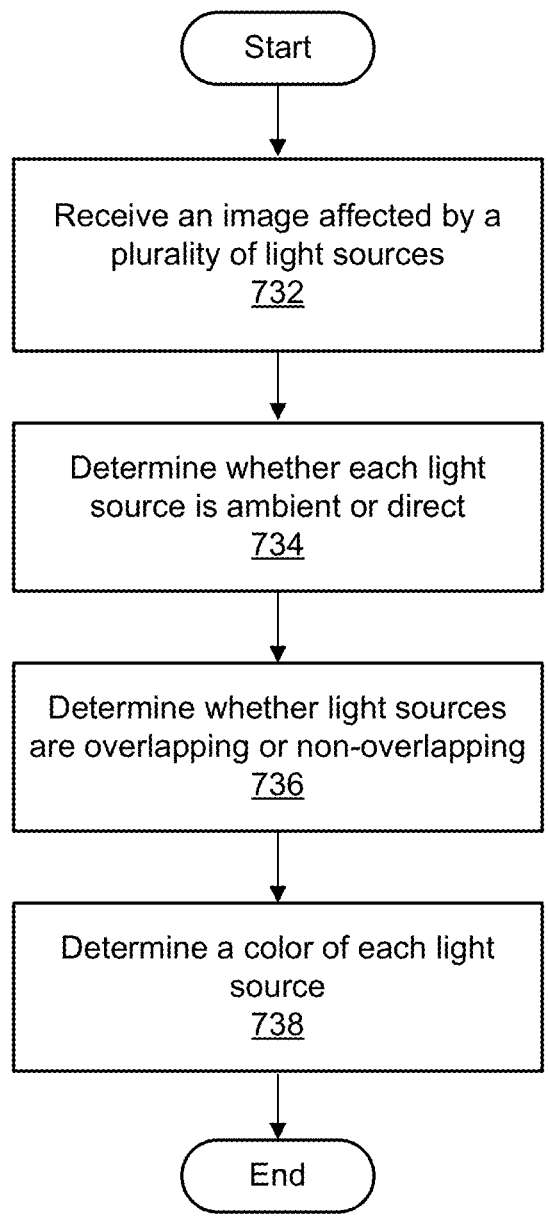
FIG. 11 is a flowchart illustrating a method for determining the color characteristics of light sources according to one embodiment.

FIG. 11 is a flowchart illustrating a method for determining the color characteristics of light sources according to one embodiment. As shown in 732, an image comprising pixels may be received (e.g., by the digital image editing program 100 executing on a computer system 900). As shown in 734, each of the plurality of light sources may be determined to be ambient or direct. As shown in 736, the plurality of light sources may be determined to be overlapping or non-overlapping.

As shown in 738, the color of each of the plurality of light sources in the image may be determined. In one embodiment, different techniques may be used to determined the color based on whether the light sources are ambient or direct and/or based on whether the light sources are overlapping or non-overlapping. The colors of the light sources may be determined according to the systems and methods discussed above. In one embodiment, the intensity and direction of each light source may also be determined.

In various embodiments, the elements shown in the flow diagrams discussed herein may be performed in a different order than the illustrated order. In the flow diagrams discussed herein, any of the operations described in the elements may be performed programmatically (i.e., by a computer according to a computer program). In the flow diagrams discussed herein, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
    receiving an image comprising pixels, wherein the image is affected by a plurality of light sources, wherein the plurality of light sources comprise a first light source and a second light source, wherein light emitted by the first light source and light emitted by the second light source overlap;
    determining at least one contour comprising a plurality of connected pixels in the image;
    filtering the image to separate out of the image high frequency variations of luminance due to diffuse reflectivity determined based upon the at least one contour;
    identifying a local maxima pixel in the image, wherein the local maxima pixel comprises a brightest pixel in an area of the image;
    determining a respective intensity of each of the plurality of light sources in the image based at least on the local maxima pixel; and
    determining a respective direction of each of the plurality of light sources in the image based at least on the local maxima pixel.

2. The method as recited in claim 1, wherein the light emitted by the first light source and the light emitted by the second light source overlap by greater than 90 degrees in a screen plane.

3. The method as recited in claim 1, wherein the light emitted by the first light source and the second emitted by the second light source overlap by no greater than 90 degrees in a screen plane.

4. The method as recited in claim 1, wherein determining the respective intensity of each of the plurality of light sources in the image comprises:
    determining a high-frequency albedo variation in a plurality of pixels within the contour.

5. The method as recited in claim 1, wherein determining the respective intensity and the respective direction of each of the plurality of light sources in the image comprises:
    identifying a normal of the local maxima pixel as a candidate light direction;
    determining a candidate single light source based on the local maxima pixel and the candidate light direction;
    determining a pixel-by-pixel error value for the candidate single light source;
    determining two candidate overlapping light sources based on the local maxima pixel and the candidate light direction;
    determining a pixel-by-pixel error value for the two candidate overlapping light sources;
    selecting the two candidate overlapping light sources if the error value for the two candidate overlapping light sources is less than the error value for the candidate single light source; and
    selecting the candidate single light source if the error value for the two candidate overlapping light sources is greater than the error value for the candidate single light source.

6. The method as recited in claim 1, wherein determining the respective intensity and the respective direction of each of the plurality of light sources in the image comprises:
    applying candidate light sources to the image until an error is minimized, wherein each of the candidate light sources comprises a respective intensity and direction.

7. The method as recited in claim 1, further comprising:
    generating a second image based on the determined respective intensity of each of the plurality of light sources and the determined respective direction of each of the plurality of light sources.

8. The method as recited in claim 1, further comprising:
    determining a respective color of each of the plurality of light sources in the image.

9. A computer-implemented method, comprising:
receiving an image comprising pixels, wherein the image is affected by a plurality of light sources;
processing the image to decrease albedo associated with at least one contour of connected pixels that is determined for the image;
determining whether each of the plurality of light sources is ambient or direct;
determining whether respective lights emitted by the plurality of light sources are overlapping or non-overlapping for the image; and
determining a respective color of each of the plurality of light sources in the image.

10. The method as recited in claim 9, wherein the plurality of light sources comprise an ambient light source and a direct light source, and wherein determining the respective color of each of the plurality of light sources in the image comprises:
determining that the ambient light source is white; and
determining a color of the direct light source.

11. The method as recited in claim 9, wherein the plurality of light sources comprise a first overlapping direct light source and a second overlapping direct light source, and wherein determining the respective color of each of the plurality of light sources in the image comprises:
determining an albedo patch affected by the first overlapping direct light source and the second overlapping direct light source.

12. The method as recited in claim 9, wherein the plurality of light sources comprise a first non-overlapping direct light source and a second non-overlapping direct light source, and wherein determining the respective color of each of the plurality of light sources in the image comprises:
determining a first albedo patch affected by the first non-overlapping direct light source; and
determining a second albedo patch affected by the second non-overlapping direct light source.

13. The method as recited in claim 9, wherein determining the respective color of each of the plurality of light sources in the image comprises:
applying candidate light sources to the image until an error is minimized, wherein each of the candidate light sources comprises a respective color.

14. A computer-readable storage medium, storing program instructions, wherein the program instructions are computer-executable to implement:
receiving an image comprising pixels, wherein the image is affected by a plurality of light sources, wherein the plurality of light sources comprise a first light source and a second light source, wherein light emitted by the first light source and light emitted by the second light source overlap;
determining one or more contours of connected pixels in the image and filtering the image to remove high frequency detail indicative of the image's albedo with respect to the one or more contours;
identifying a local maxima pixel in the image, wherein the local maxima pixel comprises a brightest pixel in an area of the image;
determining a respective intensity of each of the plurality of light sources in the image based at least on the local maxima pixel; and
determining a respective direction of each of the plurality of light sources in the image based at least on the local maxima pixel.

15. The computer-readable storage medium as recited in claim 14, wherein the light emitted by the first light source and the light emitted by the second light source overlap by greater than 90 degrees in a screen plane.

16. The computer-readable storage medium as recited in claim 14, wherein the light emitted by the first light source and the light emitted by the second light source overlap by no greater than 90 degrees in a screen plane.

17. The computer-readable storage medium as recited in claim 14, wherein determining the respective intensity of each of the plurality of light sources in the image comprises:
determining at least one contour comprising a plurality of connected pixels in the image; and
determining a high-frequency albedo variation in a plurality of pixels within the contour.

18. The computer-readable storage medium as recited in claim 14, wherein determining the respective intensity and the respective direction of each of the plurality of light sources in the image comprises:
identifying a normal of the local maxima pixel as a candidate light direction;
determining a candidate single light source based on the local maxima pixel and the candidate light direction;
determining a pixel-by-pixel error value for the candidate single light source;
determining two candidate overlapping light sources based on the local maxima pixel and the candidate light direction;
determining a pixel-by-pixel error value for the two candidate overlapping light sources;
selecting the two candidate overlapping light sources if the error value for the two candidate overlapping light sources is less than the error value for the candidate single light source; and
selecting the candidate single light source if the error value for the two candidate overlapping light sources is greater than the error value for the candidate single light source.

19. The computer-readable storage medium as recited in claim 14, wherein determining the respective intensity and the respective direction of each of the plurality of light sources in the image comprises:
applying candidate light sources to the image until an error is minimized, wherein each of the candidate light sources comprises a respective intensity and direction.

20. The computer-readable storage medium as recited in claim 14, wherein the program instructions are further computer-executable to implement:
generating a second image based on the determined respective intensity of each of the plurality of light sources and the determined respective direction of each of the plurality of light sources.

21. The computer-readable storage medium as recited in claim 14, wherein the program instructions are further computer-executable to implement:
determining a respective color of each of the plurality of light sources in the image.

22. A computer-readable storage medium, storing program instructions, wherein the program instructions are computer-executable to implement:
receiving an image comprising pixels, wherein the image is affected by a plurality of light sources;
removing from the image high frequency detail indicative of the image's diffuse reflectivity as determined at least in part based upon a gradient of connected pixels within a contour that is computed for the image;
determining whether each of the plurality of light sources is ambient or direct;

determining whether respective lights emitted by the plurality of light sources are overlapping or non-overlapping for the image; and determining a respective color of each of the plurality of light sources in the image.

23. The computer-readable storage medium as recited in claim 22, wherein the plurality of light sources comprise an ambient light source and a direct light source, and wherein determining the respective color of each of the plurality of light sources in the image comprises:

determining that the ambient light source is white; and determining a color of the direct light source.

24. The computer-readable storage medium as recited in claim 22, wherein the plurality of light sources comprise a first overlapping direct light source and a second overlapping direct light source, and wherein determining the respective color of each of the plurality of light sources in the image comprises:

determining an albedo patch affected by the first overlapping direct light source and the second overlapping direct light source.

25. The computer-readable storage medium as recited in claim 22, wherein the plurality of light sources comprise a first non-overlapping direct light source and a second non-overlapping direct light source, and wherein determining the respective color of each of the plurality of light sources in the image comprises:

determining a first albedo patch affected by the first non-overlapping direct light source; and determining a second albedo patch affected by the second non-overlapping direct light source.

26. The computer-readable storage medium as recited in claim 22, wherein determining the respective color of each of the plurality of light sources in the image comprises:

applying candidate light sources to the image until an error is minimized, wherein each of the candidate light sources comprises a respective color.

27. A system, comprising:

at least one processor; and a memory coupled to the at least one processor, wherein the memory stores program instructions, wherein the program instructions are executable by the at least one processor to:

receive an image comprising pixels, wherein the image is affected by a plurality of light sources, wherein the plurality of light sources comprise a first light source and a second light source, wherein light emitted by the first light source and light emitted by the second light source overlap;

identify a local maxima pixel in the image, wherein the local maxima pixel comprises a brightest pixel in an area of the image;

determine a respective intensity of each of the plurality of light sources in the image based at least on the local maxima pixel by at least determining at least one contour including a plurality of connected pixels in the image, and determining a high-frequency albedo variation in a plurality of pixels within the contour; and determine a respective direction of each of the plurality of light sources in the image based at least on the local maxima pixel.

28. The system as recited in claim 27, wherein the light emitted by the first light source and the light emitted by the second light source overlap by greater than 90 degrees in a screen plane.

29. The system as recited in claim 27, wherein the light emitted by the first light source and the light emitted by the second light source overlap by no greater than 90 degrees in a screen plane.

30. The system as recited in claim 27, wherein, in determining the respective intensity of each of the plurality of light sources in the image, the program instructions are executable by the at least one processor to:

analyze a gradient of the plurality of pixels within the contour to eliminate the high-frequency albedo variation.

31. The system as recited in claim 27, wherein, in determining the respective intensity and the respective direction of each of the plurality of light sources in the image, the program instructions are executable by the at least one processor to:

identify a normal of the local maxima pixel as a candidate light direction;

determine a candidate single light source based on the local maxima pixel and the candidate light direction;

determine a pixel-by-pixel error value for the candidate single light source;

determine two candidate overlapping light sources based on the local maxima pixel and the candidate light direction;

determine a pixel-by-pixel error value for the two candidate overlapping light sources;

select the two candidate overlapping light sources if the error value for the two candidate overlapping light sources is less than the error value for the candidate single light source; and select the candidate single light source if the error value for the two candidate overlapping light sources is greater than the error value for the candidate single light source.

32. The system as recited in claim 27, wherein, in determining the respective intensity and the respective direction of each of the plurality of light sources in the image, the program instructions are executable by the at least one processor to:

apply candidate light sources to the image until an error is minimized, wherein each of the candidate light sources comprises a respective intensity and direction.

33. The system as recited in claim 27, wherein the program instructions are executable by the at least one processor to:

generate a second image based on the determined respective intensity of each of the plurality of light sources and the determined respective direction of each of the plurality of light sources.

34. The system as recited in claim 27, wherein the program instructions are executable by the at least one processor to:

determine a respective color of each of the plurality of light sources in the image.

35. A system, comprising:

at least one processor; and a memory coupled to the at least one processor, wherein the memory stores program instructions, wherein the program instructions are executable by the at least one processor to:

receive an image comprising pixels, wherein the image is affected by a plurality of light sources;

analyze the image to determine one or more contours of the image and eliminate high-frequency albedo variations due to diffuse reflectivity using the one or more contours of the image;

determine whether each of the plurality of light sources is ambient or direct;

determine whether respective lights emitted by the plurality of light sources are overlapping or non-overlapping for the image; and determine a respective color of each of the plurality of light sources in the image.

36. The system as recited in claim 35, wherein the plurality of light sources comprise an ambient light source and a direct light source, and wherein, in determining the respective color of each of the plurality of light sources in the image, the program instructions are executable by the at least one processor to:
   determine that the ambient light source is white; and determine a color of the direct light source.

37. The system as recited in claim 35, wherein the plurality of light sources comprise a first overlapping direct light source and a second overlapping direct light source, and wherein, in determining the respective color of each of the plurality of light sources in the image, the program instructions are executable by the at least one processor to:
   determine an albedo patch affected by the first overlapping direct light source and the second overlapping direct light source.

38. The system as recited in claim 35, wherein the plurality of light sources comprise a first non-overlapping direct light source and a second non-overlapping direct light source, and wherein, in determining the respective color of each of the plurality of light sources in the image, the program instructions are executable by the at least one processor to:
   determine a first albedo patch affected by the first non-overlapping direct light source; and
   determine a second albedo patch affected by the second non-overlapping direct light source.

39. The system as recited in claim 35, wherein, in determining the respective color of each of the plurality of light sources in the image, the program instructions are executable by the at least one processor to:
   apply candidate light sources to the image until an error is minimized, wherein each of the candidate light sources comprises a respective color.

40. A computer-implemented method, comprising:
   executing instructions on a specific apparatus so that binary digital electronic signals representing an image are received at said specific apparatus, wherein the image is affected by a plurality of light sources, wherein the plurality of light sources comprise a first light source and a second light source, wherein the first light source and the second light source overlap;
   executing instructions on said specific apparatus so that binary digital electronic signals representing the image are analyzed to compute one or more contours of the image and filtered using the one or more contours to remove high frequency detail indicative of albedo for the image and retain low frequency detail associated with luminance changes for each pixel of the image;
   executing instructions on said specific apparatus so that binary digital electronic signals representing one or more local maxima pixels in the image are identified, wherein each local maxima pixel comprises a brightest pixel in a respective area of the image;
   executing instructions on said specific apparatus so that binary digital electronic signals representing a respective intensity of each of the plurality of light sources in the image are determined based at least on the one or more local maxima pixels;
   executing instructions on said specific apparatus so that binary digital electronic signals representing a respective direction of each of the plurality of light sources in the image are determined based at least on the one or more local maxima pixels; and
   storing said binary digital electronic signals representing the respective intensity of each of the plurality of light sources and said binary digital electronic signals representing a respective direction of each of the plurality of light sources in a memory location of said specific apparatus for later use.

41. A computer-implemented method, comprising:
   executing instructions on a specific apparatus so that binary digital electronic signals representing an image are received at said specific apparatus, wherein the image is affected by a plurality of light sources;
   executing instructions on said specific apparatus so that binary digital electronic signals representing the image are analyzed to compare one or more contours of connected pixels in the image, the one or more contours employed to eliminate high-frequency albedo variations in the image due to diffuse reflectivity;
   executing instructions on said specific apparatus so that binary digital electronic signals representing the plurality of light sources are determined to be either ambient or direct;
   executing instructions on said specific apparatus so that said binary digital electronic signals representing the plurality of light sources are determined to be either overlapping or non-overlapping for the image;
   executing instructions on said specific apparatus so that binary digital electronic signals representing a respective color of each of the plurality of light sources in the image are determined; and
   storing said binary digital electronic signals representing the respective color of each of the plurality of light sources in a memory location of said specific apparatus for later use.

* * * * *

UNITED STATES PATENT AND TRADEMARK OFFICE
CERTIFICATE OF CORRECTION

PATENT NO. : 8,463,072 B2
APPLICATION NO. : 12/370385
DATED : June 11, 2013
INVENTOR(S) : Sunil Hadap et al.

Page 1 of 1

It is certified that error appears in the above-identified patent and that said Letters Patent is hereby corrected as shown below:

In the Claims

Claim 41, Column 22, Line 30, between "...analyzed to" and "one or more...", delete "compare" and insert -- compute --, therefor.

Signed and Sealed this
Fifth Day of November, 2013

Teresa Stanek Rea
*Deputy Director of the United States Patent and Trademark Office*